United States Patent [19]
Lee et al.

[11] 3,958,244
[45] May 18, 1976

[54] TRANSMITTER OUTPUT MONITOR

[76] Inventors: James Goon Nam Lee, c/o Universal Printing Press, 19 Jardine Crescent,, Causeway Bay, Hong Kong, Hong Kong; Christopher James O'Hara, 25 Croydon Ave., Croydon, New South Wales, Australia

[22] Filed: Sept. 25, 1974

[21] Appl. No.: 509,206

[52] U.S. Cl. .......................... 343/106 D; 325/133; 343/108 M
[51] Int. Cl.² .......................................... G01S 1/38
[58] Field of Search .................. 343/106 D, 108 M; 325/133

[56] References Cited
UNITED STATES PATENTS

| | | | |
|---|---|---|---|
| 2,496,259 | 2/1950 | Bachmann | 325/133 |
| 3,023,410 | 2/1962 | Hansel | 343/106 D |

*Primary Examiner*—Malcolm F. Hubler
*Assistant Examiner*—Richard E. Berger
*Attorney, Agent, or Firm*—Beveridge, DeGrandi, Kline & Lunsford

[57] ABSTRACT

A monitor for detecting faults in the output signals of a transmitter in which a selected modulation component of the signal is used to activate fault-detecting means. In the case of a DVOR beacon system, the sub-carrier frequency is filtered from the detected and amplified signal obtained by a monitor antenna and applied to a full-wave rectifier, and the fault detecting means responds to the absence of one or more of the unidirectional pulses thus produced.

2 Claims, 1 Drawing Figure

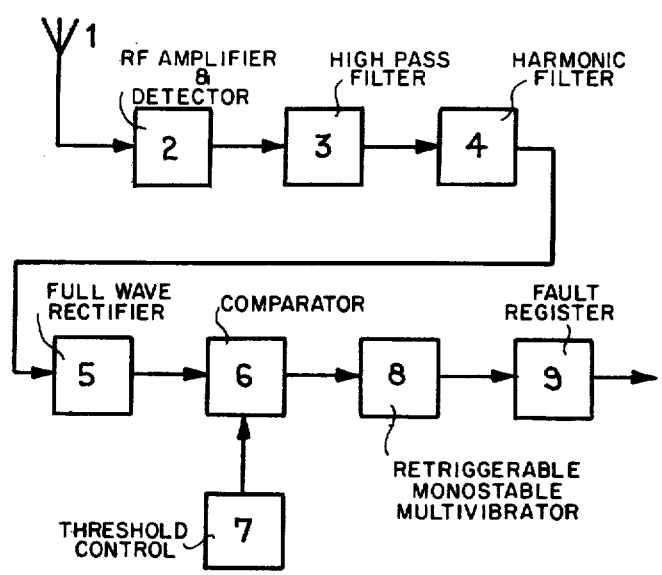

TRANSMITTER OUTPUT MONITOR

This invention relates to a transmitter output monitor, that is, an equipment which is responsive to the output signal of a radio transmitter and which provides a characteristic indication when one or more parameters of the output signal deviate from design values by more than a specified tolerance.

Monitors of this type are frequently used, especially when the transmitter is unattended. They are of particular importance when the transmitter is a component of a radio navigation aid, where faulty transmitter output signals may give rise to dangerous errors.

It is the object of this invention to provide an improved monitor to detect faults in transmitter output signals which are not detected by known means. In one embodiment of the invention the monitor is used to detect lack of radiation from one or more of a plurality of aerial elements. While not restricted thereto, the said embodiment of the invention applies particularly to Doppler VHF Omnirange (DVOR) equipment, and because of the comparatively rigorous requirements of that equipment, will be explained with reference to such a system.

VHF Omnirange (VOR) is the standard short range navigation aid for aircraft. It is in world-wide use and is well known, so that no detailed description is necessary. Briefly, a standard VOR signal has two principal components, (a) a 30Hz A.M. signal which is amplitude-modulated onto the station RF carrier to a depth of 30%, and (b) a 9960Hz subcarrier signal which is amplitude-modulated on to the station RF carrier to a depth of 30%; this 9960Hz subcarrier signal is in turn frequency-modulated by a 30Hz signal with a modulation index of 16. Co-operating equipment in an aircraft measures the phase of the second 30Hz signal relative to the former and derives from that measurement the bearing of the station from the aircraft.

Doppler VOR (DVOR) is a development of VOR which gives greater accuracy, particularly on sites where reflection of the transmitted signal from natural or manmade objects is a problem. The system is known, and one version has been adequately described in the literature — see, for example "A Double-Sideband Doppler VHF Omnirange Beacon" by Johnson and Lee, Proc. IREE Australia, Vol. 34, No. 5, June 1973.

In a Doppler VOR, the 9960Hz subcarrier (incorporating the 30Hz frequency modulation) is produced by radiating an RF signal from a circular array of antennas. An RF signal is switched sequentially around a ring of antennas, at a 30Hz rate to produce a 30Hz frequency modulation on this RF signal. This RF signal is known as the "sideband" signal and it is mixed "in space" with the signal radiated from an antenna located at the centre of the ring. This second RF signal is termed the "carrier" signal.

The carrier and sideband signals differ in frequency by a nominal 9960Hz. Thus, the effect of the addition of these two components in space is to produce a 9960Hz amplitude modulation on the carrier signal with a 30Hz frequency modulation on the 9960Hz signal. To produce a 30% modulation depth on the carrier, a total sideband power equal to 0.045 of the carrier power is required.

The sideband power can be radiated as (a) one separate signal radiated from one part of the ring only, that is, a single sideband system using either the upper or the lower sideband, (b) two RF signals radiated simultaneously from diametrically-opposite sides of the ring, that is, a double sideband system, both upper and lower sidebands radiated, or (c) upper and lower sidebands radiated in turn from diametrically opposite sides of the ring, that is, an alternating sideband system.

In each of these systems the sideband signal (or signals) is switched sequentially, from one antenna to the next, around the entire ring. If one antenna fails (i.e., ceases to radiate) then an error will be introduced into the bearing information contained in the 30Hz FM on the 9960Hz subcarrier. The magnitude of this error depends on the kind of system in use, as will be seen later.

Since the bearing information resides in the phase relationship between the reference phase and the variable phase, it is necessary to ensure that the phase relationship is not disturbed by a fault in the beacon, and the radiated signal is monitored to that end. In one system, this is done by arranging monitor aerials outside and spaced around the ring and connecting them to phasemeasuring equipment. Deviation from the correct phase relationship actuates an alarm and closes down the DVOR beacon. A similar situation may arise wherever a plurality of radiating elements is in use, but possibly with other criteria such as field pattern distortion upon which the release of an alarm or initiation of shut down is based.

In one known arrangement, for example, three monitor antennas are placed around a DVOR beacon, spaced at approximately 120° intervals. The station bearing is then measured at each of the three points.

However, measurements with a double sideband DVOR have shown that if a near field (less than 500 feet from beacon) monitoring antenna system is used, then there are certain causes of diametrically-opposite antenna failures that cannot be detected by bearing measurement alone.

Thus it has been found that this system does not detect all faults. The possibility exists that one or more of the ring of aerials ceases to radiate caused, for example, by switch failure. In the single sideband and alternating sideband systems failure of a single aerial causes a momentary interruption in radiation of the variable phase signal, resulting in a "notch" in the signal received by an aircraft and producing a large bearing error. In the double sideband system the variable phase signal is distrubed in amplitude by the failure of one of the ring of aerials, which produces a small bearing error, but failure of two diametrically opposite aerials will cause a large error. These errors may not be detected by presently-known measuring means.

The problem thus resolves itself into the certain detection of failure of a single antenna, and in the DVOR case into the detection of a notch in the nominal 9960Hz subcarrier frequency.

The arrangement in accordance with this invention comprises only one monitor antenna located at least 250 ft from a DVOR beacon. The single monitor antenna can be placed at any bearing around the beacon. The RF signal picked up by the monitor antenna is amplified and detected to produce a normal DVOR audio signal, comprising 30Hz AM, the 9960Hz subcarrier, and identification and voice signals where present. The 9960Hz subcarrier is separated from the composite signal by means of a high-pass filter. The arrangement as described so far is the customary arrangement for monitoring.

However, the present arrangement employs the separated subcarrier signal for the detection of failed antennas. In a DSB DVOR, for example, the failure of two diametrically opposite antennas causes a deep notch to appear on the separated subcarrier. The method in accordance with this invention comprises the step of examining the envelope of the subcarrier to see if a notch is present. The presence of a notch in the subcarrier signal is used to initiate an alarm and eventually a beacon shut-down. It has been found that the notch formed with two diametrically opposite antennas failed is very deep, and the 9960Hz amplitude at the bottom of the notch is small compared with the 9960Hz amplitude at the top.

In its general form a transmitter output monitor in accordance with this invention comprises an antenna, means for amplifying and detecting signals emitted from the transmitter which are picked up by the said antenna, means for evaluating the recovered modulation in terms of a predetermined criterion based on a selected modulation component, and means for recognising a fault and initiating predetermined action upon non-attainment of the predetermined criterion.

In a DVOR beacon system a transmitter output monitor in accordance with this invention comprises a monitor antenna placed in the vicinity of the beacon, means for amplifying and detecting signals emitted from the beacon and picked up by the monitor antenna, filtering means for separating from the modulation the nominal 9960kHz subcarrier frequency and for removing harmonics from the subcarrier frequency, full-wave rectifier means for deriving a series of unidirectional pulses at twice the frequency of the subcarrier, and means responsive to the absence of one or more of the unidirectional pulses for registering a fault and initiating predetermined action.

A certain level is therefore chosen so that if the 9960 Hz subcarrier level instantaneously drops below this level, then an alarm will occur. A notch which does not cause the 9960 Hz subcarrier to drop below the notch threshold level will not cause an alarm. This is usually the case in the DSB DVOR when only one antenna fails, a notch being produced but being not deep enough to cause an alarm. However, whilst this is usually the case, it has been found that certain cases of single antenna failure do in fact cause a notch deep enough to trigger an alarm, but these are only few. In any case it is clearly competent to adjust the threshold over which any alarm or the like is released to a desired level.

One example of a transmitter output monitor in accordance with this invention will now be described in relation to a DSB DVOR system with reference to the accompanying drawing. A sample of the radiated energy is picked up by a single monitor antenna 1 and fed to an RF amplifier and detector 2. The detected output is filtered in a high-pass filter 3 to separate the 9960 Hz subcarrier.

The recovered subcarrier is then passed through an harmonic filter 4 to remove harmonic components that are or may be present in the subcarrier signal. These harmonic components are caused in a DSB DVOR system by slight misphasing of the RF signals, a problem which is peculiar to that type of system. It follows that in an arrangement in accordance with this invention the harmonic filter is an optional element dependent on the application of the novel arrangement, and does not form an essential part of the invention in its wider aspects.

The filtered subcarrier is now rectified in a full-wave rectifier 5 to produce a unidirectional nominal 20 kHz signal, that is, a signal at twice the frequency of the 9960 Hz (say 10kHz) subcarrier. This effective doubling of the subcarrier frequency increases the sensitivity of the arrangement as a simple envelope detector would have difficulty in following the notch. If a notch is present in the subcarrier signal, it will be reproduced at the output of the rectifier 5.

The rectified output is fed to a comparator 6 where the notch threshold level is set by means of a threshold control 7. When the input to the comparator exceeds the threshold a high output is produced, whilst when the input does not exceed the threshold a low output is produced. The output of the comparator is normally a series of unidirectional logic pulses, occurring in this example at a nominal 20 kHz rate. However, if a notch is present in the sub-carrier the input to the comparator will remain below the notch threshold for a corresponding time during which no output pulses will be delivered from the comparator.

The pulse-train output from the comparator is now applied to a retriggerable monostable multivibrator 8. This multivibrator functions like a normal monostable multivibrator to the extent that it produces one output pulse of constant width when it is triggered. However it also has the property of being capable of being retriggered before the output pulse is finished. Thus if a first trigger causes the output to go high and a second trigger arrives before the output drops back to low again, then the output will remain high and will recommence its timing cycle again from the second trigger pulse. Consequently if trigger pulses keep arriving with intervals less than the timing period, the output of the multivibrator will be held in a constant high state. However the presence of a notch will allow the output to go low.

For example, in this present system being used as a vehicle for the description, the retriggerable monostable multivibrator has a timing period of 75 microseconds. Because in this system the pulses from the comparator arrive (in the absence of a notch) every 50 microseconds, the output will remain high. However, if a notch appears in the subcarrier signal, the comparator pulses will disappear for a corresponding time, and the absence of one such pulse will allow the multivibrator to go low, indicating the presence of the notch.

The output from the retriggerable monostable multivibrator is applied to a fault register 9, where it is stored. The fault register may take any convenient form known per se, depending on the specific application, and may include resetting means. The fault register is used to initiate a desired action upon the occurrence and detection of a fault, for example the shut-down of a beacon, the release of an alarm, or other desired responsive action.

It will be appreciated that a fault will be registered not only on the occurrence of a notch, but also when for any cause the subcarrier falls below the level necessary to attain the threshold level in the monitoring arrangement. This may happen for example in a DSB DVOR system if the RF phase of the system shifts so as to cause a high amount of 60Hz AM on the subcarrier. Thus, high subcarrier AM can also be detected, and the threshold level can be set to register a fault whenever the subcarrier AM exceeds a certain amount. This places a limitation on the allowable proximity of the monitor antenna to the beacon of approximately 250 ft mentioned earlier, as a closer placement of the monitor antenna causes an increase in subcarrier 60 Hz AM due to proximity effect. This is considered a minor disadvantage in relation to the advantages of this arrangement. This arrangement uses only one monitor antenna and is applicable to any known type of DVOR system. The circuitry used is clearly noncritical and permits easy field adjustment, for example the adjustment of the threshold level. The arrangement is fail safe in that the arrangement can be incorporated into a system in such a way that a fault is registered when the performance of the monitored apparatus falls or the monitor itself develops a fault.

Whilst the arrangement the object of this invention has been described in its application to a DSB DVOR system, its application to other DVOR systems will be clear to those skilled in the art, as will the application of the arrangement to situations other than those involving DVOR beacons.

We claim:

1. In a DVOR beacon system a transmitter output monitor comprising a monitor antenna placed in the vicinity of the beacon, means for amplifying and detecting signals emitted from the beacon and picked up by the monitor antenna, filtering means for separating from the modulation the nominal 9960kHz subcarrier frequency and for removing harmonics from the subcarrier frequency, full-wave rectifier means for deriving a series of unidirectional pulses at twice the frequency of the subcarrier, and means responsive to the absence of one or more of the unidirectional pulses for registering a fault and initiating predetermined action.

2. A transmitter output monitor for use with a transmitter the output of which includes a modulating signal of constant frequency and constant relative amplitude, comprising a monitor antenna placed in the vicinity of the transmitter antenna, means for amplifying and detecting the output from the transmitter picked up by the monitor antenna, filtering means for separating from the modulation the modulating signal of constant frequency and constant relative amplitude and for removing harmonics therefrom, full wave rectifier means for deriving a series of unidirectional pulses at twice the frequency of the said modulating signal, and means responsive to the absence of one or more of the unidirectional pulses for registering a fault and initiating predetermined action.

* * * * *